United States Patent [19]

Solazzi

[11] 4,402,909

[45] Sep. 6, 1983

[54] VIALS FOR COMMINUTING AND BLENDING SAMPLES FOR SPECTROCHEMICAL ANALYSIS

[75] Inventor: Michael C. Solazzi, Eastchester, N.Y.

[73] Assignee: Chemplex Industries, Inc., Eastchester, N.Y.

[21] Appl. No.: 315,727

[22] Filed: Oct. 28, 1981

[51] Int. Cl.$^{3}$ .................... G01N 35/00; B01L 9/00; B02C 17/04; G01N 1/00

[52] U.S. Cl. .................... 422/50; 206/220; 220/70; 241/169.2; 366/602; 422/102; 422/104; 436/174

[58] Field of Search .................... 220/70, 8; 366/602; 206/219, 220; 422/102, 68, 104, 50; 241/168, 169, 169.2, DIG. 27; 436/174

[56] References Cited

U.S. PATENT DOCUMENTS

| | | | |
|---|---|---|---|
| 2,541,065 | 2/1951 | Jabour | 220/70 |
| 3,889,835 | 6/1975 | Avant et al. | 220/70 |
| 3,926,324 | 12/1975 | Zavasnik | 220/70 |
| 4,134,510 | 1/1979 | Chang | 220/70 |
| 4,182,447 | 1/1980 | Kay | 366/602 |

*Primary Examiner*—Michael S. Marcus
*Attorney, Agent, or Firm*—Arthur L. Plevy

[57] ABSTRACT

A sample vial for use in comminuting and blending material samples for spectrochemical analysis has a vial body section of a cylindrical configuration with a closed recessed bottom end having an inner concave semi-spherical surface. The body section has an opened top end with an inner flange surrounding the same. A cover member is also of a cylindrical configuration and has a closed recessed top end with the inner surface of the cover member of a concave semi-spherical shape. The cover member has an inner peripheral flange for insertion into an opened top end of the vial body section to form a friction fit closure which acts as a seal to prevent particle material from leaking out of the vial. The composite internal hollow of the vial provides a smooth uniform surface to allow a pestle to traverse the same when the vial is vibrated.

1 Claim, 4 Drawing Figures

VIALS FOR COMMINUTING AND BLENDING SAMPLES FOR SPECTROCHEMICAL ANALYSIS

BACKGROUND OF INVENTION

This invention relates to a sample vial and more particularly to such a vial for use in comminuting samples for spectrochemical analysis.

The effects of particle size, shape, hardness and distribution are influential to the quantitative analysis of powdered samples by spectroscopy techniques. One of the easiest and most experienced method to reduce these variables to a minimizing effect is by comminution of all particles to a uniform micron size. Conventional methods of grinding are incapable of producing micron size particles and are ineffective in reducing particle size to levels where sample differences are insignificant.

In order to provide a proper particle size various devices known as micronizing mills have been developed to improve the prior art techniques. In such devices a sample of material is placed in a vial and the vial is positioned between a mechanical device such as a vise or jaws and is vibrated in an oscillatory mode. Inside the vial there is included a pestle which may be a one or more metal or plastic elements such as spherical members. As the vial is vibrated the pestle moves within the vial to impact and crush or grind the sample. In this manner the resultant samples are suitable for use in X-ray diffraction analysis, X-ray fluorescent analysis, infrared analysis and other applications as well.

In regard to operating with such devices one requires a reliable and efficient vial or container to hold the sample and the pestle. In this manner the vial should be capable of withstanding relatively high impact forces which are produced during the oscillatory mode which accelerates the pestle at high speed thereby producing high momentum and large forces. The vial should be economical to construct while providing means to enable the same to be easily placed and held within a sample grinder or micronizing mill.

It is therefore an object of the present invention to provide an improved sample vial for comminuting and blending powdered and liquid samples for spectrochemical analysis.

BRIEF DESCRIPTION OF THE PREFERRED EMBODIMENT

A sample vial for use in comminuting and blending material samples for spectrochemical analysis, comprising a vial body section of a longitudinal tubular configuration of a given length having a closed recessed bottom end with an inner surface as located in the hollow of said body section having a concave semi-spherical surface, said configuration having an opened top end with an inner flange surrounding said opened top, a cover member section of a longitudinal tubular configuration of a smaller length than said predetermined length having a closed recessed top end with the inner surface as located within the hollow of said cover member having a concave semi-spherical surface of the same shape as said surface of said vial body with an opened bottom end having an inner peripheral flange for insertion into the opened top end of said vial body section to provide a sealed friction-fit closure while forming a composite internal hollow of a smooth surface configuration with both semi-spherical surfaces of said vial body and said cover member forming top and bottom surfaces for said composite internal hollow.

DETAILED DESCRIPTION OF THE FIGURES

Figure 1:
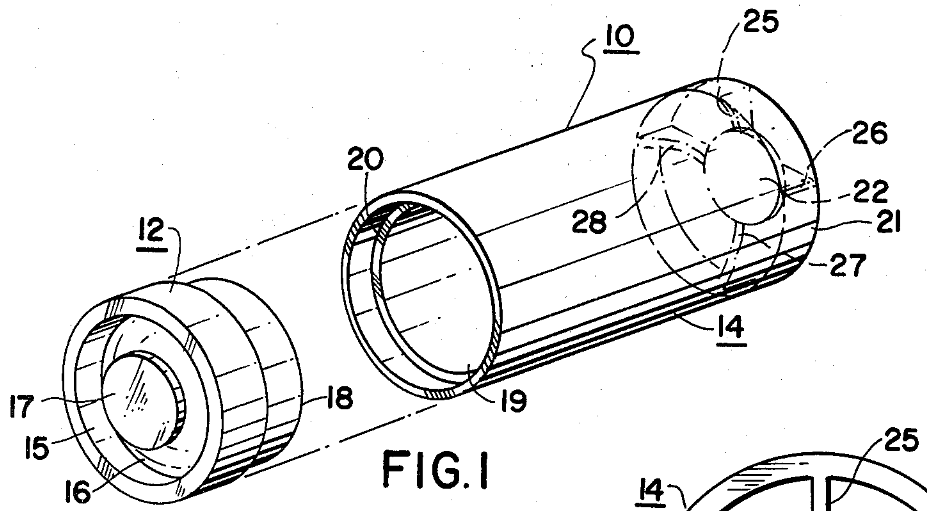
FIG. 1 is a perspective plan view of a sample vial according to this invention.

Referring to FIG. 1, there is shown a sample vial 10 according to this invention. The vial 10 consists of a cap or cover member 12 and a longitudinal tubular vial body 14. Both the vial 10 and the cap 12 may be fabricated from a suitable plastic or metal. Preferably both the vial body 14 and the cover 12 are fabricated from a clear plastic. As seen in FIG. 1, the cover has a top depression 15. The top surface 16 of the cap is spherical and of a radius equal to the inner radius underlying the top surface. Located centrally on the top surface 16 of the cap 12 is a raised circular projection 17 which projection offers greater strength and rigidity while further acting as a key or retaining device together with the top depression 16 to hold the vial in a secure position. The cover has an inner flange 18 provided about the bottom opened end and adapted to congruently fit within the top opening 19 of the vial body 14. The vial body 14 contains an inner flange 20 located at a distance below the top opening and adapted to receive the bottom edge of the cover flange 18. The vial body 14 has a closed bottom surface 21 which also has a spherical inner and outer surface with the inner surface being concave and the outer surface being convex. Located at the center of the bottom surface of body 14 is a circular projection 22 which is similar in configuration to projection 17. Emanating from projection 22 are four support flanges as 25 to 28 which further provide strength and rigidity.

Figure 2:
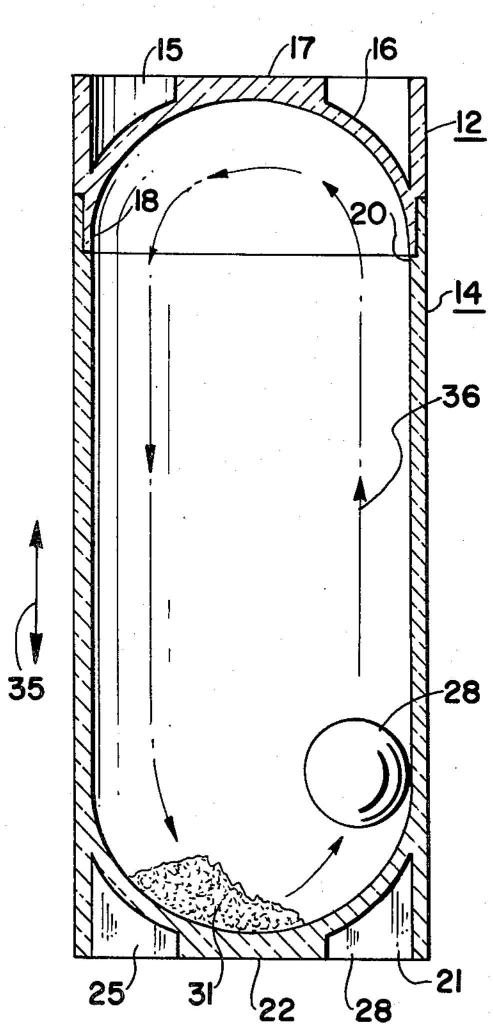
FIG. 2 is a cross-sectional view taken along the major axis of a vial according to this invention.

Referring to FIG. 2, there is shown a cross-section of the vial with the cover 12 emplaced upon the vial body 14. As one can see from FIG. 2, the inner surfaces of the vial body 14 and the cover member 12 have a radius which interfaces with the sides of the cover and the capsule to provide a smooth inner surface. Thus the vial body has a concave inner surface within the composite hollow with a convex outer surface. The shape of the recessed top surface of the cover member 12 is the same and has a concave inner surface and a convex outer surface. Thus when the cover member 12 is emplaced upon the vial body 14, the composite internal hollow has facing semi-spherical surfaces as seen in FIG. 2. The surface is such that it insures impact of the pestle 28 and the sample 31. Prior art vials which are available have flat bottoms which entrap the sample preventing it from being exposed to the radius of the pestle.

As seen in FIG. 2, the sample 31 is placed within the vial as is the pestle 28. As the vial is oscillated back and forth in the direction indicated by arrow 35, both the pestle and the sample traverse the semi-elliptical path designated by the arrow 36. The inside walls of the vial are continuous and smooth without any edges and obstructions. As can be seen from FIG. 2, the cover member 12 with the inner flange 18 smoothly and uniformly coacts with the top opening 19 and flange 20 of the vial body 14 to provide a smooth surface at the point of closure. In this manner one completely avoids obstructions or edges which serve as entrapment areas for the sample material 31 which thereby reduces the amount of sample material which can be effectively grinded. The flange closure between the cover 12 and the body 14 is friction fitting and provides an effective seal even when the sample 31 is a liquid. Thus the friction fitting is unique in that it prohibits material from being entrapped or leaking out of the closed vial. The top and bottom surfaces of both the cover 12 and the vial 14 are of the same radius. This provides uniform impact forces at each surface which occur when the pestle is traversing the inner surface of the vial. The outer raised areas as 17 and 22 serve to further strengthen the cap 12 and the vial body 14 by adding support at the center of the spherical surfaces and hence operate to provide mechanical rigidity.

Figure 3:
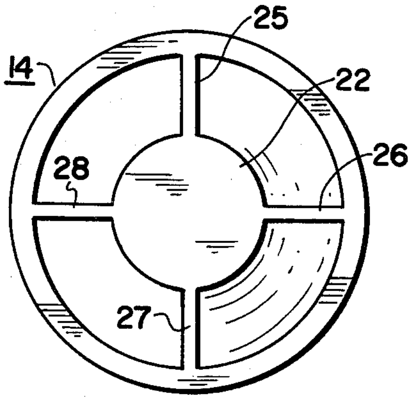
FIG. 3 is a bottom plan view of the vial body.

The bottom surface of the vial body 14 is further strengthened by the support flanges 25 to 28 as shown in FIG. 3. These prevent breakage during the high forces which are developed when the pestle traverses from one end of the vial to the other. In the vial shown comminution is effected by the sample becoming entrapped inbetween the pestle and the ends of the vial. The forces of the impact of the pestle against the end of the vial grinds and/or blends the sample material for a more homogeneous mixture having greater uniform particle size and distribution. The exterior ends of both the cover 12 and the vial body 14 are recessed in order to safely retain the vials with the sample and ball pestle in a grinder during a comminution process.

Figure 4:
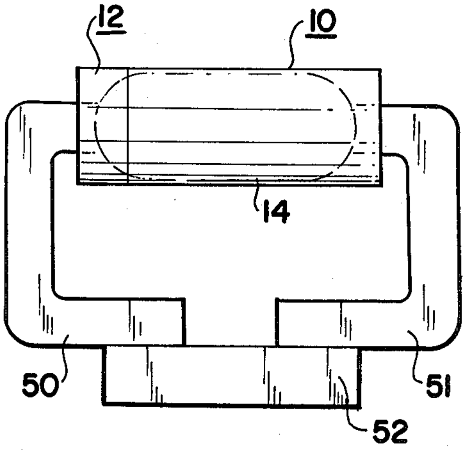
FIG. 4 is a simple schematic view depicting the vial retained in a clamping device.

Referring to FIG. 4, there is shown two adjustable jaws 50 and 51 located on a vibratory base 52. The projecting ends of the jaws fit into the recesses on the top and bottom of the sample. Jaw 50 which holds the cover may have a circular depression on its end to overlie the projection 17. Jaw 51 may have a circular depression with 90° cutouts to overlie projection 22 and the support flanges 25 to 28. In this manner the vial acts as a key to enable insertion into the jaws as 50 and 51 with the cover located at jaw 50 and the vial body obtained by jaw 51.

The technique shown provides a friction fitting closure which serves the dual purpose of preventing sample material from escaping while providing a uniform inner surface to prevent particle entrapment. In a typical vial the height from the top of cap 12 to the bottom of the vial may be 50 mm. The diameter from end to end is 13 mm. The flange 18 may be 4 mm with a thickness of 0.75 mm. The thickness of each wall is about 1 mm. The material used for both the cover and the vial body may be polystyrene or polypropylene.

The above described sample vial has great utility while being easy to construct and use and is adapted to hold a great number of different materials which must be comminuted for spectrochemical analysis.

I claim:

1. A sample vial for use in comminuting and blending material samples for preparing the same for spectrochemical analysis, comprising in combination:

(a) a micronizing mill having a right and left jaw said left jaw having a depression, with said right jaw having a depression which jaws undergo oscillatory motion due to vibration of said jaws by said mill, (b) a vial body section of a longitudinal tubular configuration of a given length having a closed recessed bottom end with the closed recessed end having an upstanding central projection for providing a keyed insertion for said circular depression of said left jaw, said body section having an opened top end with an inner flange surrounding said opened top end, with the internal hollow of said section having a concave semi-spherical bottom surface continuous with inner sidewalls to provide a continuously smooth uninterrupted hollow for said body section, (c) a cover member section of a longitudinal tubular configuration of a smaller length than said given length having a closed recessed top with said top having a raised circular projection with extending flanges differentiating said top from said top of said body section and adapted for being accommodated by said depression of said right jaw of said mill, with the inner surface of the hollow of said cover member having a concave semi-spherical surface of the same shape and dimensions as said bottom surface of said vial body, said cover member having an inner peripheral flange for insertion into the opened top end of said vial body section to provide a sealed friction fit closure while forming a continuously smooth uninterrupted inner hollow surface with said vial body section and said cover member when emplaced thereon with both semi-spherical surfaces of said vial body section and said cover member section forming top and bottom surfaces for said internal hollow with the major outer surface of said cover member section and said vial body section being a continuously smooth uninterrupted surface, a pestle contained in said internal hollow and caused to traverse a semi-elliptical path as determined by said shape of said internal hollow and according to the oscillatory motion of said mill, with said pestle traversing said path between said top and bottom semi-spherical surfaces of said vial body and cover member sections.

* * * * *